United States Patent
Suzuki

(10) Patent No.: US 6,680,675 B1
(45) Date of Patent: Jan. 20, 2004

(54) INTERACTIVE TO-DO LIST ITEM NOTIFICATION SYSTEM INCLUDING GPS INTERFACE

(75) Inventor: Hikaru Suzuki, Gunma-machi (JP)

(73) Assignee: Fujitsu Limited, Kanagawa (JP)

( * ) Notice: Subject to any disclaimer, the term of this patent is extended or adjusted under 35 U.S.C. 154(b) by 380 days.

(21) Appl. No.: 09/598,094

(22) Filed: Jun. 21, 2000

(51) Int. Cl.[7] .............................................. G08G 1/123
(52) U.S. Cl. .................. 340/988; 340/825.49; 455/456; 455/457; 342/357.01; 342/357.17; 342/450; 701/213; 701/300
(58) Field of Search .......................... 340/988, 995, 340/996, 825.49, 425.5; 701/207, 208, 201, 211, 213, 214, 300; 455/456, 457; 342/357.01, 357.17, 450, 357.06, 357.08, 357.13

(56) References Cited

U.S. PATENT DOCUMENTS

| | | | |
|---|---|---|---|
| 4,831,526 A | 5/1989 | Luchs et al. .............. 364/401 |
| 5,111,391 A | 5/1992 | Fields et al. .............. 364/401 |
| 5,182,705 A | 1/1993 | Barr et al. .................. 364/401 |
| 5,557,515 A | 9/1996 | Abbruzzese et al. ........ 364/401 |
| 5,559,548 A | 9/1996 | Davis et al. .................... 348/6 |
| 5,644,722 A | 7/1997 | Miyamoto et al. .......... 395/209 |
| 5,648,770 A | * 7/1997 | Ross .......................... 340/988 |
| 5,684,990 A | * 11/1997 | Boothby ...................... 707/203 |
| 5,826,260 A | 10/1998 | Byrd, Jr. et al. ............... 707/5 |
| 5,844,558 A | 12/1998 | Kumar et al. ............... 345/339 |
| 5,850,214 A | * 12/1998 | McNally et al. ............. 345/173 |
| 5,948,041 A | * 9/1999 | Abo et al. .................. 455/456 |
| 6,085,148 A | * 7/2000 | Jamison et al. ........ 342/357.01 |
| 6,208,974 B1 | * 3/2001 | Campbell et al. ............... 705/3 |
| 6,212,393 B1 | * 4/2001 | Suarez et al. .......... 340/825.49 |
| 6,266,612 B1 | * 7/2001 | Dussell et al. ......... 342/357.17 |
| 6,360,101 B1 | * 3/2002 | Irvin .......................... 455/456 |

* cited by examiner

*Primary Examiner*—Daniel J. Wu
(74) *Attorney, Agent, or Firm*—Christie, Parker & Hale, LLP

(57) ABSTRACT

A system and method for alerting a user of an item on a to-do list if the user is detected to be close to the item's performance location. Each to-do list item is entered to a mobile user terminal such as one that might be supported in an automobile. The mobile terminal includes a GPS interface that allows an automatic detection of the mobile terminal when the automobile is in motion. Using the GPS interface, the mobile terminal periodically compares the position of the user with various to-do list item locations to determine whether the user will pass within a pre-defined proximity metric of the listed item. Whenever a particular criteria is satisfied, the system provides a notification to the user of a potential to-do list item. In response to the notification, the user indicates that the user has accepted the notification by transmitting a "confirmed" status, or has completed the item by transmitting a "completed" status. A to-do list may be shared by multiple terminals for family or business use. In this case, to-do list items are identified specific user identifiers. Notifications and status flags for a particular user's to-do list item are shared among the multiple terminals to update the list once a particular item status has been "confirmed" or "completed."

13 Claims, 9 Drawing Sheets

FIG.3

| TASK | LOCATION ENTERED | LOCATION ADDRESS | USER ID | STATUS |
|---|---|---|---|---|
| BUY ITEM X | AAA DISCOUNT STORE 111 MAIN STREET LOS ANGELES | 111 MAIN STREET LOS ANGELES | 001 | CONFIRMED |
| BUY ITEM Y | BBB SUPERMARKET FIRST STREET | 222 FIRST STREET LOS ANGELES | 002,003 | COMPLETED |
| PICK-UP DRY-CLEAN | CCC DRY-CLEANERS | 333 STATE STREET LOS ANGELES | 001 | NOT NOTIFIED |
| ... | ... | ... | ... | ... |

| NAME — 40a | CITY — 40b | ADDRESS — 40c |
|---|---|---|
| AAA DISCOUNT STORE | BURBANK | 222 UNION STREET |
| AAA DISCOUNT STORE | LOS ANGELES | 111 MAIN STREET |
| BBB SUPERMARKET | LOS ANGELES | 222 FIRST STREET |
| BBB SUPERMARKET | PASADENA | 123 SECOND STREET |
| CCC DRY CLEANERS | LOS ANGELES | 333 STATE STREET |
| ... | ... | ... |

| USER ID | USER NAME | TERMINAL ID |
|---------|-----------|-------------|
| 001 | JANE DOE | 124 |
| 002 | MARY DOE | 333 |
| ... | ... | ... |

41a — USER ID
41b — USER NAME
41c — TERMINAL ID
41

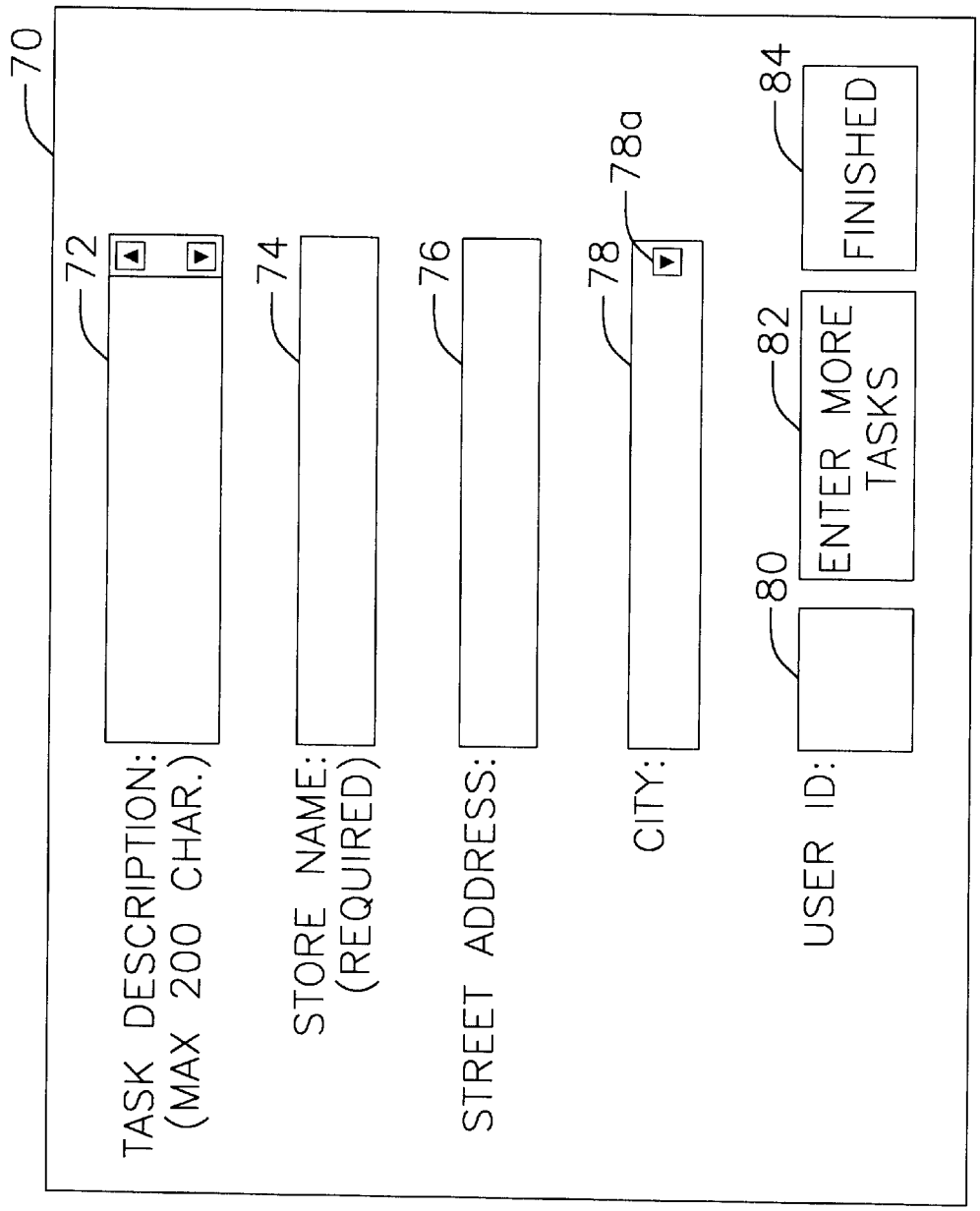

INTERACTIVE TO-DO LIST ITEM NOTIFICATION SYSTEM INCLUDING GPS INTERFACE

FIELD OF THE INVENTION

The present invention relates generally to electronic notification systems, and more particularly, to an electronic system and method for providing an alert of an entry in a to-do list when a user is within a pre-defined proximity location to perform the to-do list item.

BACKGROUND OF THE INVENTION

In today's fast-paced world, "efficiency" is a motto adopted by many people. Such efficiency does not only apply to the work place, but also to every-day living. As the tasks that need to be accomplished within a day grow in number, and the amount of time in a day to accomplish such tasks seem to decrease, it becomes more and more important to efficiently manage one's time and plan the tasks that need to be accomplished within that time in a practical and organized manner. The amount of planning carried out by an individual as the order in which to accomplish the tasks efficiently become futile if the individual forgets the order or a task to be accomplished.

Thus, various devices exist in the prior art to aid individuals in the organization and reminder of tasks. For instance, personal notes and post-its placed on refrigerator doors, calendars, and the like, help remind individuals of tasks to be accomplished in a day. Schedule books and personal organizers also help individuals keep track of time-sensitive tasks and appointments. If electronic calendars and organizers are used, users may be electronically notified via the device's alarm or notification process when it is time to carry out a particular task or appointment.

If a task is not time-sensitive, users often place such a task in a separate to-do list. Typical tasks entered into a to-do list include, for example, buying an article X at store A, an article Y at store B, stopping by the bank, going to the post office, going to the dry-cleaner, and running other types of errands. Whether such a to-do list is maintained manually or electronically, the user must make an effort to check the list in order to not forget a particular task that needs to be accomplished. Failure to check the to-do list at a particular time and be reminded of the task might cause inefficient management of the user's time. For instance, a user who is heading to store B might forget to stop by the bank which is on the way to store B. This might cause the user to waste additional time to retrace his or her steps to make the visit to the bank, or forego this task completely. In either case, the user has made ineffective usage of his or her time.

The prior art also fails to provide an effective method to share a to-do list among various individuals. For instance, one family member may have already accomplished a task on the to-do list which a second family member has also set out to accomplish. This again results in ineffective usage of both family members' times. Either member could have devoted his or her time to a different task on the to-do list.

Accordingly, there is a need for an electronic system and method for providing an alert when a user is in a pre-defined proximity location to a facility, store, or the like, which has an entry on a to-do list. The reminder allows the user to then accomplish the task at the location. Such system should also maintain track of other users sharing a to-do list item, and notify the other users when the shared to-do list item has been accomplished.

SUMMARY OF THE INVENTION

The present invention addresses and alleviates the above-mentioned deficiencies associated with the prior art. More particularly, the present invention comprises a system and method for notifying a user of a to-do list item if the user is detected to be in a particular proximity location to the to-do list item.

In one aspect of the invention, a method for providing electronic notification of a to-do list item includes entering the to-do list to a mobile user terminal. The mobile user terminal includes a global positioning system (GPS) interface allowing the automatic detection of the user's current position as the user embarks on his or her errands. The mobile terminal periodically compares the current position of the mobile terminal with the performance location of a to-do list item. Electronic notifications are then sent to the user if a proximity criteria of the to-do list item has been satisfied. The user might then send a confirmation that the notification has been received.

The proximity criteria is based on numerous factors, such as the user's current position, the user's destination, the route chosen to reach the destination and the like. The proximity criteria may also vary from task to task. If the proximity criteria is based on the user's current position, the criteria is satisfied if the distance between a detected current location and a performance address is within a pre-determined proximity metric (i.e. one mile, one half mile, or the like).

In another aspect of the invention, a particular to-do list item may be shared by multiple users. In this scenario, one or more user IDs are associated with a to-do list item. Electronic notifications for the item are then sent to all the users with the associated user IDs. When one of these users transmits a confirmation of the notification, an update status message is transmitted to the other users sharing the to-do list item. The update status message changes the status of the to-do list item from "Not Notified" to "Confirmed." Further notifications of the confirmed item are then transmitted only to the confirming user. The other users sharing the confirmed to-do list item are excluded from receiving further notifications.

In yet another aspect of the invention, the sharing of a to-do list among multiple users is effectuated via a central host computer. In this scenario, the to-do list is entered into the host computer and downloaded to the sharing mobile terminals. A confirmation message from one of the mobile terminals is transmitted to the host computer, and the host computer transmits the update status message to the sharing mobile terminals.

It will be appreciated, therefore, that the present invention allows for efficient time and schedule management for dealing with multiple tasks in a single excursion. With the system's alert mechanism, users no longer run the risk of forgetting an errand that could have been efficiently been performed during a trip to a destination location.

The present invention also allows a to-do list to be effectively shared among various individuals. By maintaining track of the users sharing a to-do list item and the status of each of the items, the sharing users will know when a particular task has been confirmed or completed.

BRIEF DESCRIPTION OF THE DRAWINGS

These and other features, aspects and advantages of the present invention will be more fully understood when considered with respect to the following detailed description, appended claims and accompanying drawings wherein:

FIG. 3 is a schematic layout diagram of a To-Do List database;

FIG. 4 is a schematic layout diagram of a Location database;

FIG. 5 is a schematic layout diagram of a user database;

FIG. 7 is an illustration of a screen display for entering a to-do list to the system of FIG. 1.

DETAILED DESCRIPTION OF THE INVENTION

In general terms, the present invention is directed to a particular system and method for alerting a user of an item on a to-do list if the user is detected to be close to the item's performance location, thereby allowing the user to accomplish the task. Each to-do list item is entered to a mobile user terminal such as one that might be supported in an automobile. The mobile terminal includes a GPS interface that allows an automatic detection of the mobile terminal when the automobile is in motion. Using the GPS interface, the mobile terminal periodically compares the position of the user with various to-do list item locations to determine whether the user will pass within a pre-defined proximity metric (e.g. one mile, half mile, or the like) of the listed item. The proximity metric is calculated according to various criteria, including the user's current position, the user's destination, the route chosen to reach the destination, and the like. Whenever a particular criteria is satisfied, the system provides a notification to the user of a potential to-do list item.

In response to the notification, the user indicates that the user has accepted the notification by transmitting a "confirmed" status. Once the to-do item has been completed, the user might change the item's status by indicating that the item has been "completed." The present system and method thus allow for efficient time and schedule management for dealing with multiple tasks in a single excursion.

According to one embodiment of the invention, the present system and method incorporates a single mobile terminal for personal use. Alternatively, the present system and method incorporates multiple terminals for family or business use. In the case of multiple terminals and/or multiple users, particular items may be identified with a specific user ID so that the to-do list item is performed by the appropriate person. Notifications and status flags for a particular user's to-do list item are shared among the multiple terminals to update the list once a particular item status has been "confirmed" or "completed."

Figure 1:
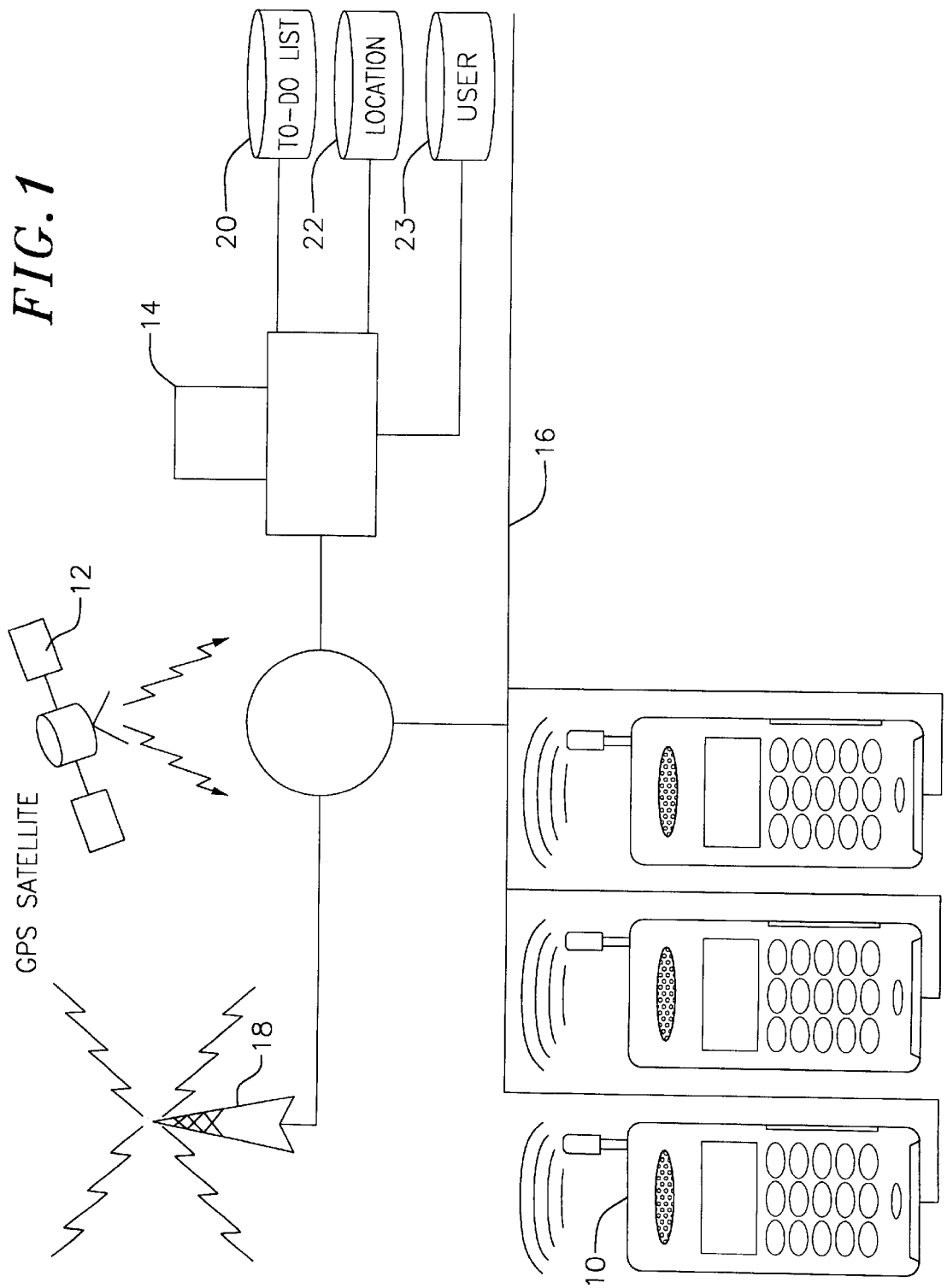
FIG. 1 is a schematic block diagram of an interactive to-do list item notification system including a mobile user terminal.

Considering the foregoing, FIG. 1 depicts a schematic block diagram of an interactive to-do list item notification system. In the exemplary embodiment of FIG. 1, a mobile user terminal 10 storing a to-do list receives GPS signals from a GPS satellite system 12. The mobile terminal 10 processes the GPS signals for automatically detecting the position of the terminal 10, and hence, the position of the user of the terminal as the user embarks on his or her errands. If the user is in a proximity location to an item's performance location, the mobile terminal 10 displays an alert reminding the user of the to-do list item.

A to-do list may be shared by multiple users and/or multiple mobile terminals (collectively referred to as 10) via a central host computer 14. The communication between the mobile terminals 10 and the host computer 14 may be wired 16 and/or wireless 18, using traditional computer networks, cellular phone networks, public telephone networks, and/or satellite system networks.

To effectuate notification of to-do list items to the multiple mobile terminals 10, the host computer 14 preferably hosts three databases: a To-Do List database 20, Location database 22, and user database 23. In the illustrated embodiment, the three databases reside in three separate mass storage devices, each taking the form of a hard disk drive or drive array. It is noted, however, that the three databases may also reside in a single mass storage device. If the to-do list is not to be shared among multiple users or terminals 10, the To-Do List database 20 and Location database 22 reside within the mobile terminals themselves.

The To-Do List database 20 stores a to-do list along with one or more user IDs and a performance address for each item on the to-do list, as is explained in further detail below in conjunction with FIG. 3. The user IDs indicate the individuals who are responsible for accomplishing the indicated task. The performance address indicates a specific address where the task is to be accomplished.

The Location database 22 maps performance locations to specific performance addresses, as is also described in further detail below in conjunction with FIG. 4. Thus, if the user enters a performance location, such as the name of a store or a branch, instead of a specific address, the host database 14 searches the Location database 22 to find the specific address of the indicated task. The host computer 14 then stores the to-do list item with the specific performance address in the To-Do List database 20.

The user database 23 maps particular users to particular mobile terminals 10, as is also explained below in conjunction with FIG. 5. Thus, communications received from a particular terminal may be mapped to the user transmitting the communication. Furthermore, communications may be transmitted to particular users by identifying the terminals associated with such users.

In downloading the to-do list to the multiple mobile terminals 10, the host computer 14 retrieves the to-do list from the To-Do List database 20 and examines the user IDs associated with the to-do list items. The host computer 14 then transmits the entire to-do list along with the user IDs and the performance addresses to the mobile terminals 10 indicated by the user IDs, via wired 16 or wireless 16 media. Alternatively, the host computer 14 creates separate to-do lists from the retrieved master to-do list based on the user IDs, and transmits the individualized to-do list to each user. If a particular task is assigned to more than one person, the task is included in the to-do list for all the assigned users.

In an alternative embodiment, a to-do list is shared by multiple terminals 10 without the aid of a central host computer 14. For instance, a to-do list may be shared among various family members by maintaining a separate user ID for each member of the family. Each task is then associated with one or more user IDs. The to-do list along with the associated user IDs are then stored in each family member's mobile terminal.

Figure 2:
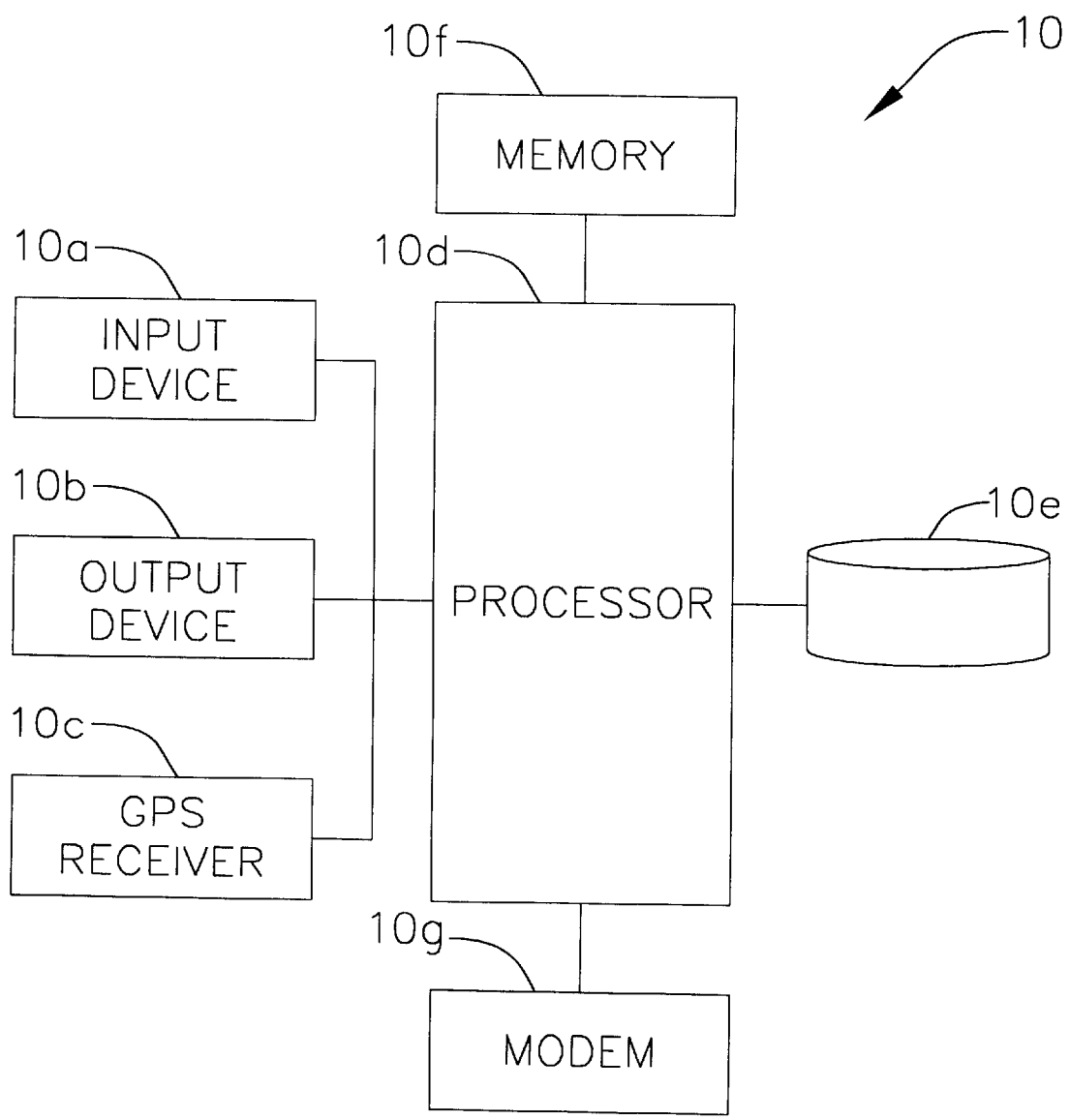
FIG. 2 is a more detailed schematic block diagram of the mobile user terminal of FIG. 1.

FIG. 2 is a more detailed schematic block diagram of the mobile user terminal 10 of FIG. 1. According to one embodiment of the invention, the mobile terminal is installed into an automobile. If the automobile already includes a GPS system, the mobile terminal may make use of the automobile's GPS interface for location detection. In an alternative embodiment, the mobile terminal 10 is not installed into the automobile, but is a stand-alone unit capable of being hand-carried by a user.

In the situation where the central host computer 14 is not used, a user enters a to-do list including the performance location of each to-do list item directly into the mobile terminal 10 using an input device 10a. The user also uses the input device 10a to change the status of a to-do list item. The input device may take the form of a keyboard or a numeric or alphanumeric button or keypad arrangement. Specialized keys or buttons on the input device 10a relate to specialized functions performed with respect to the to-do list, such as entering or downloading the to-do list, and transmitting "confirmed" and "accepted" status messages.

In a multiple user and/or multiple mobile user terminal scenario including the central host computer 14, the to-do list is entered directly into the host computer and downloaded to each mobile terminal 10. Alternatively, the to-do list is entered through the mobile terminal 10 and uploaded to the host computer 14. The host computer 14 is configured with similar input devices as the mobile terminal 10 to allow entry of the to-do list. The mobile terminal 10 includes a modem 10g for downloading/uploading the to-do list from/ to the host computer 14. The modem 10g may take the form of a traditional modem for wired communication, and/or a wireless modem for communication with the host computer 14 via wireless media.

The mobile terminal 10 also includes an output device 10b to alert the user of a to-do list item via visual and/or audio instruments according to well known methods. The audio component of the output device 10b includes one or more speakers and a voice synthesizer for providing audio alerts to the user. The speakers may optionally be coupled to the speakers of the automobile. The mobile terminal 10 may further emit vibrations to alert the user of a to-do list item.

The visual component of the output device 10b preferably comprises a VGA, SVGA liquid-crystal-display (LC) screen, an LED display screen, or any other suitable display apparatus. Pressure sensitive (touch screen) technology may be incorporated into the display 10b so that the user may interact with the mobile terminal 10 by merely touching certain portions of the screen. Alternatively, the keyboard or keypad arrangement is provided in combination with the display screen to define the input device 10a.

A GPS receiver 10c also incorporated to the mobile terminal 10 allows communication with the GPS satellite system 12. The GPS receiver 10c is a specialized radio receiver designed to listen to radio signals transmitted by the GPS satellite system 12. The radio signals provide latitude and longitude information to the mobile terminal 10 according to well-known methods. The latitude and longitude information allows the mobile terminal 10 to detect the user's current location and provide alerts based on the detected location.

The mobile terminal 10 further includes a processor 10d for taking the input list from the input device 10a or the input list that has been downloaded via the modem 10g, and storing it into memory 10f or an external storage device (not shown). The memory 10f is a RAM or other suitable variations of a RAM. If the performance location entered by the user for a particular to-do list item is not a specific performance address, the processor 10d converts the performance location to a specific performance address before storing the to-do list into the memory 10f. In this regard, the processor 10d accesses the mobile terminal's Location database 10e mapping performance locations with performance addresses, as is described in further detail below in conjunction with FIG. 4. In its simplest form, the Location database is a yellow-page directory of schools, stores, businesses, and other facilities in a specified geographic area. The Location database 10e resides in a mass storage device such as a CD ROM, DVD, or hard disk drive. According to one embodiment of the invention, the Location database 10e also includes digital or graphic maps of the geographic area.

FIG. 3 is a schematic layout diagram of a To-Do List database 20 stored by the host computer 14 and downloaded to the mobile terminal's memory 10f or the external storage device. A similar database is created by the mobile terminal 10 itself if the to-do list is entered directly by a user. The database 20 includes a to-do list table 30 with a plurality of to-do list items. The to-do list items may be arranged in a variety of ways, but is most advantageously configured as sequential entries, with each entry specific to a particular task to be accomplished. A particular task entry includes a "Task" field 30a, typically implemented as a series of text strings, for describing a particular task to be accomplished.

A particular task entry further includes a "Location Entered" field 30b and a "Location Address" field 30c, also implemented as a series of text strings. The "Location Entered" field 30b reflects the performance location of the task identified by the user. A user might give an exact address as the performance location. In this case, the "Location Address" field 30c includes the exact address entered by the user. Alternatively, the user might not know the exact address of a performance location, or might know only a portion of the address, such as the street name. In this case, the host computer 14 (or the mobile terminal 10) converts the performance location entered by the user into a specific performance address, and stores the performance address in the "Location Address" field 30c. The address conversion routine is described in further detail in conjunction with FIG. 6.

In the event of multiple users and/or multiple mobile terminals 10, each task entry of the to-do list table 30 also includes a "User ID" field for indicating one or more unique user identifiers such as identification numbers responsible for accomplishing the particular task. A particular task might be assigned to more than one individual.

A "Status" field also included in each task entry indicates the status of a particular task. Initially, all tasks are initialized as being "Not Notified." When a user receives notification for a particular to-do list item, and transmits a confirmation that the alert was received, the status of the particular item is changed to a "Confirmed" status. In a multi-user scenario, the "Status" field includes the user ID of the user transmitting the confirmed status. The user transmits a completion of a particular to-do list item if the task has been accomplished. In this event, the status of the particular task entry is again changed to reflect a "Completed" status.

FIG. 4 is a schematic layout diagram of a Location database 22, 10e maintained either by the host computer 14 or the mobile terminal itself 10, depending on whether the to-do list is to be shared among multiple users/terminals. The database 22, 10e includes a location table 40 with a plurality of location-specific information. The location-specific information may be arranged in a variety of ways, but is most advantageously configured alphabetically in sequential entries, with each entry specific to a particular store, business, facility, and the like (collectively referred to as stores), in a particular geographic area. According to one embodiment of the invention, the Location database 22 stores a plurality of location tables for different geographic areas. For instance, separate location tables 40 might be maintained for different cities, counties, states, and the like.

A particular store entry in the location table 40 includes a "Name" field 40a, typically implemented as a series of text strings, for describing a name of the store. A location entry further includes a "City" field 40b and an "Address" field 40c, also implemented as a series of text strings. The "City" field indicates the city where the store is located, and the "Address" field 40c indicates the exact address in the city. As illustrated in FIG. 4, stores with several locations throughout the geographic area will have multiple entries in the location table 40.

Figure 5:
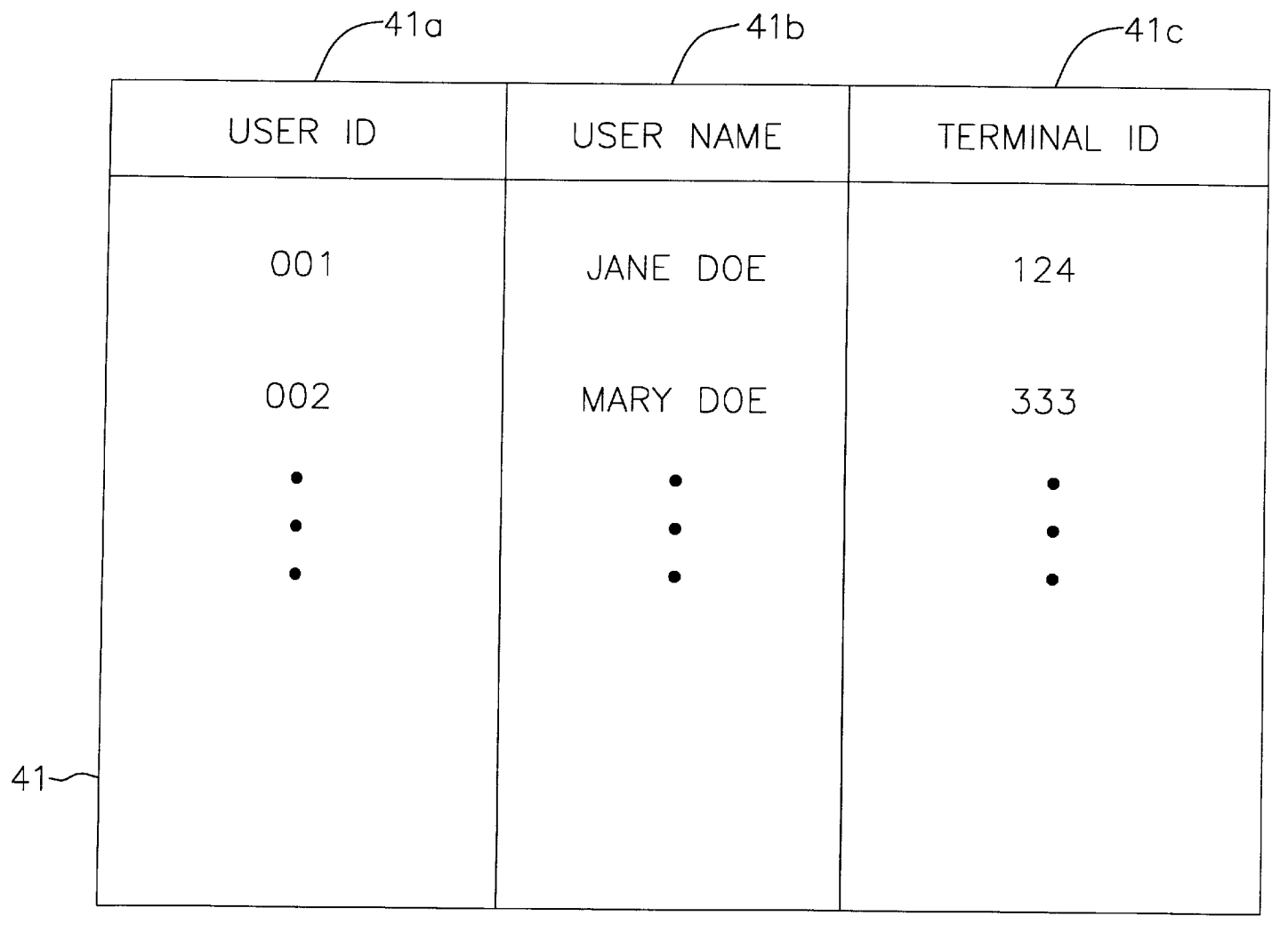

FIG. 5 is a schematic layout diagram of a user database 23 preferably maintained by the host computer 14 according to one embodiment of the invention. The user database 23 includes a user table 41 with a plurality of user-specific information. The user-specific information may be arranged in a variety of ways, but is most advantageously configured in sequential entries, with each entry specific to a particular user. A particular user entry includes a "user ID" field 41a for storing an identification for each user. A particular user entry further includes a user name 41b associated with the user ID, as well as a terminal ID 41c for identifying the particular terminal used by the user. The user database 23 is preferably used in a multiple user/terminal scenario for identifying the source of a "confirmed" or a "completed" message, as well as for sending notifications to the appropriate users.

Figure 6:
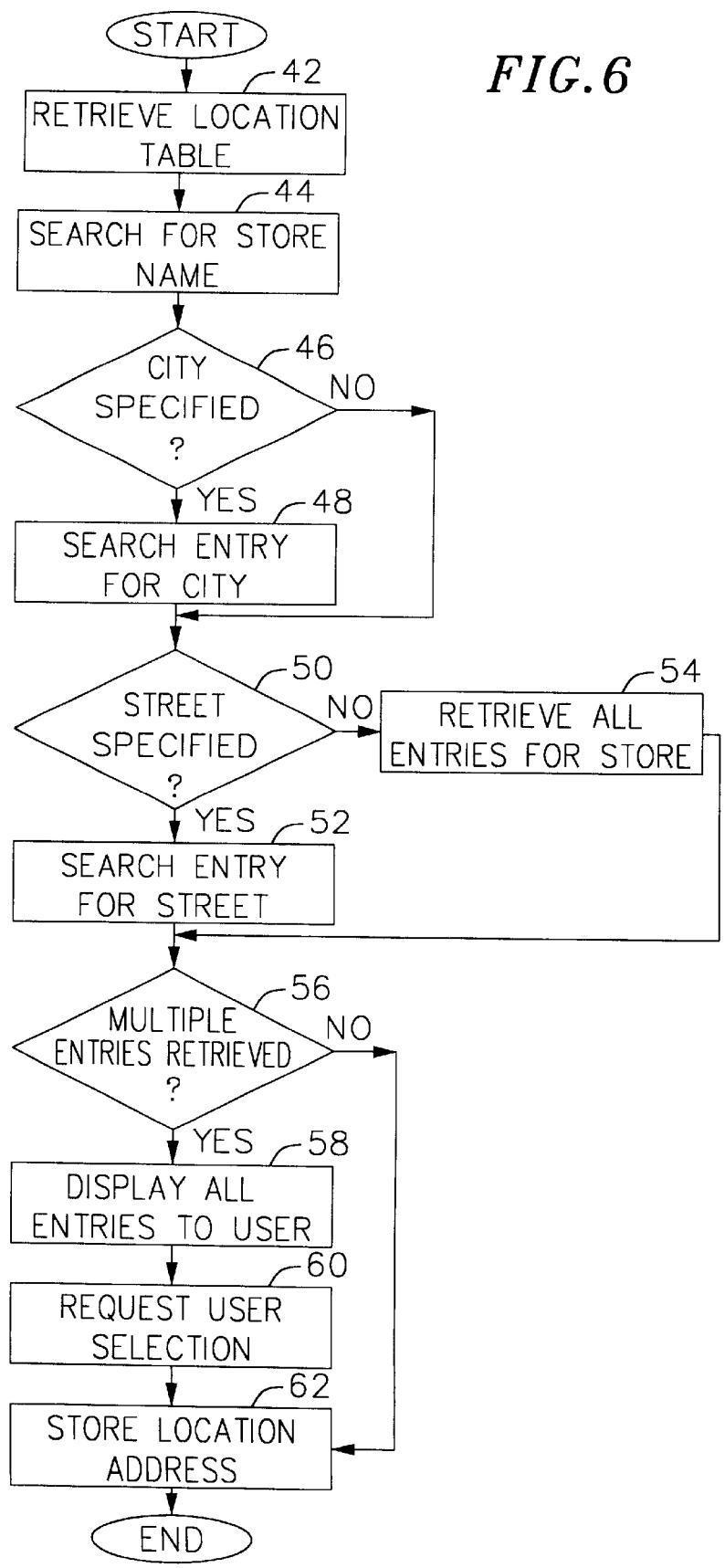
FIG. 6 is a process flow diagram of an address conversion routine according to one embodiment of the invention.

FIG. 6 is a process flow diagram of an address conversion routine implemented as a software program according to one embodiment of the invention. The address conversion routine is performed by the host computer 14 or the mobile terminal 10 if the performance location entered for a to-do list item is not an exact address. The program illustrated in FIG. 6 starts, and in step 42, retrieves the location table 40 from the location database 22 or 10e. According to one embodiment of the invention, the user, at a minimum, enters the store name as the performance location of the to-do list item. Thus, in step 44, the program searches the "Name" field of the location table 40 for the entered store name and retrieves all matching entries for the store.

In step 46, the program inquires if the user has specified a city where the store is located. If the answer is YES, the program, in step 48, searches the matching entries retrieved so far for the store in the specified city, and thus filters-out any stores located in the other cities. The program further inquires in step 50 if the user has specified a street name where the store is located. If the answer is YES, the program, in step 52, searches the currently matching entries for the store on the specified street.

If the user provided neither a city nor a street name for the store, the program retrieves in step 54 all the matching entries for the store. Alternatively, the program assumes as a default that the desired city is the city where the user resides. In this case, the program retrieves all the matching entries for the store in the default city.

In step 56, the program inquires if multiple matching entries exist. If the answer is YES, the user preferably manually narrows-down the matches to a single match. Accordingly, the program, in step 58, displays all the matching entries to the user. In step 60, the user is requested to select one of the displayed addresses as the performance address. In step 62, the program stores the selected address in the "Location Address" field 30c of the location table.

FIG. 7 is an illustration of a screen display 70 for entering a to-do list to either the host computer 14 or the mobile terminal 10 as the situation might be. The screen display 70 provides for a "Task Description" area 72 for entering a description of a to-do list item. According to one embodiment of the invention, a character limit is placed to the length of the description.

A "Store Name" area 74 allows the user to specify a store, facility, and the like, where the described task is to be accomplished. The exact address of the store is entered in a "Street Address" area 76 of the screen display 70. According to one embodiment of the invention, the store name is always required as an input. The street address is optional. The user may enter the full street address, simply a street name, or no street address at all. In an alternative embodiment, the store name is not required if the user provides an exact street address.

The city where the store is located is entered in a "City" area 78 of the screen display 70. The entry of a specific city is also optional. If the user does not enter a specific city, the default city is assumed to be the city where the user resides. A list of cities supported by the system may be viewed via a pull-down menu accessible upon selection of a "down" arrow 78a. The cities supported by the system depends on the cities supported in the Location database 22, 10e.

If a task is to be shared by multiple users, the user also enters the user ID or IDs 80 of all the users who are to share the task. Instead of a user ID, the name of such users may alternatively be entered.

After a particular to-do list item has been entered, the user may enter additional items by actuating an "Enter More Tasks" button 80. If all tasks have been entered, the user selects a "Finished" button 82 and submits the to-do list to the host computer 14/mobile terminal 10 via wired 16 or wireless 18 media. Upon receipt of the to-do list, the host computer 14/mobile terminal 10 stores the task description in the "Task" field 30a of the to-do list table 30 (FIG. 3). The store name, street address, and/or city associated with each task are bundled-up and stored into a "Location Entered" field 30b. The user ID or IDs 80 associated with the task are also stored in the "User ID" field 30d. If instead of a user ID a user name was entered, the host computer 14 translates the user name to a user ID using the user table 41 of FIG. 5 and stores the translated user ID.

Figure 8A:
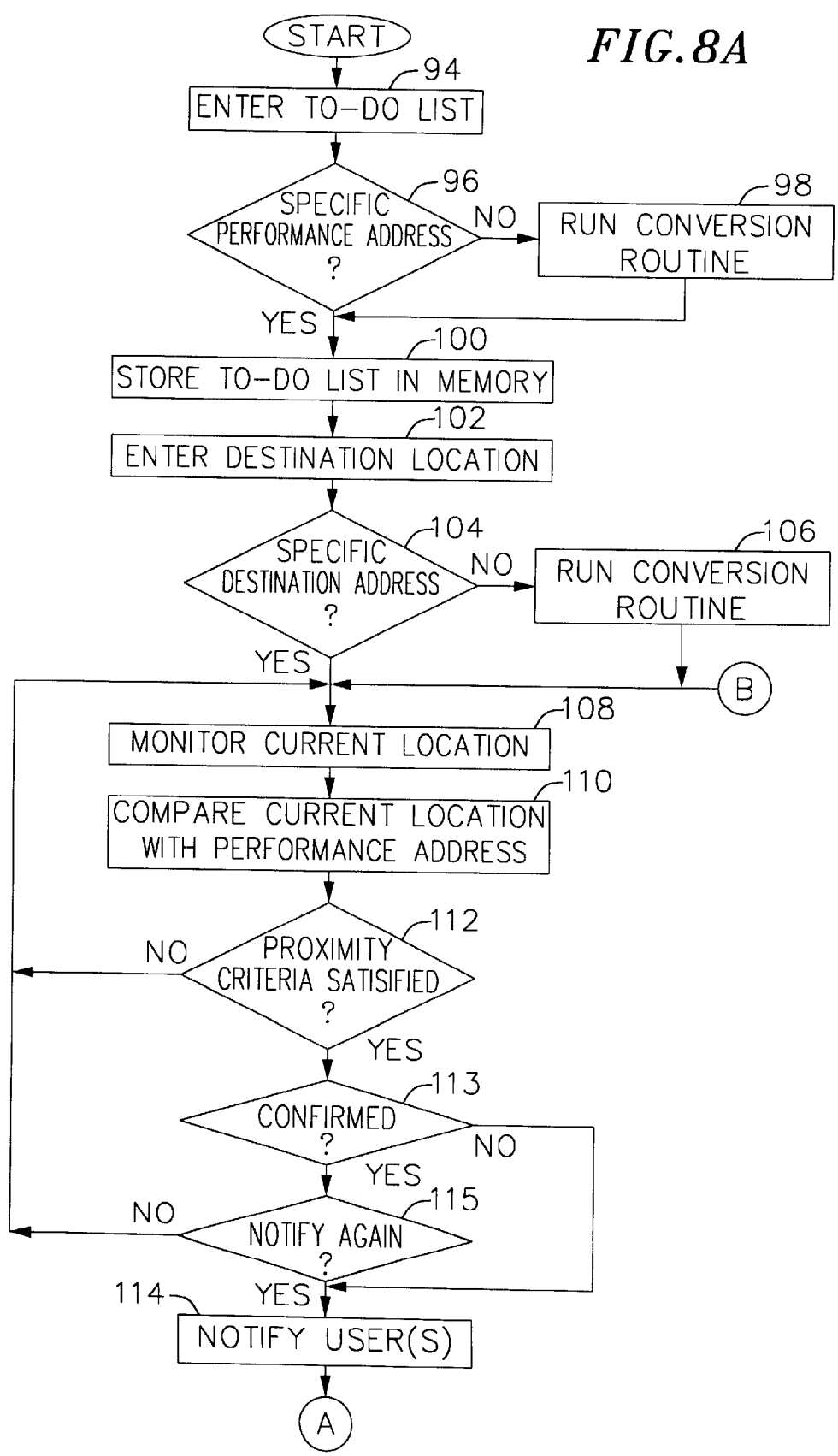
FIGS. 8A–8B are process flow diagrams of an interactive to-do list item notification software program.
Figure 8B:
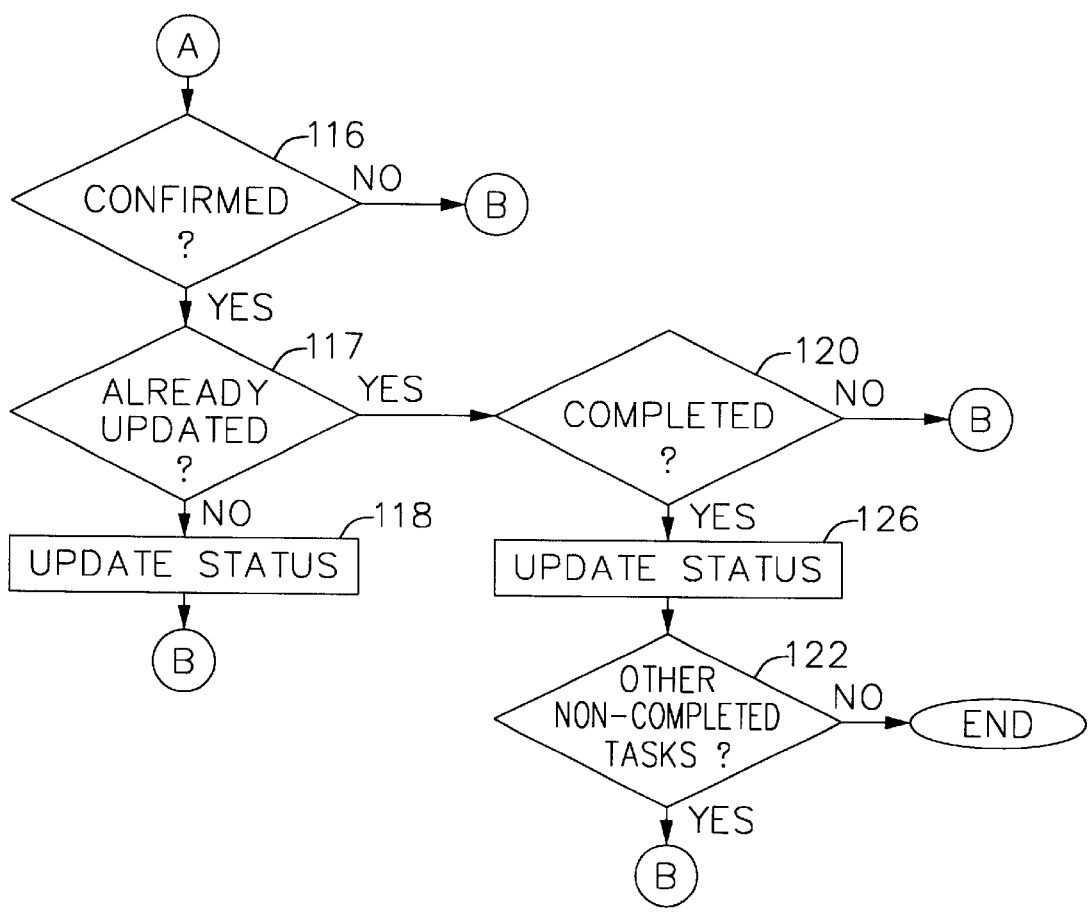

FIGS. 8A–8B are process flow diagrams of an interactive to-do list item notification software program executed by the mobile terminal 10 according to one embodiment of the invention. The program starts, and in step 94, the user enters the to-do list into the host computer 14 or directly into the mobile terminal 10. In step 96, the program inquires if the user has entered a specific performance address for each of the to-do list items. If the answer is NO, the program, in step 98, invokes the address conversion routine of FIG. 6 for each to-do list item for which a specific address has not been entered.

In step 100, the program stores the to-do list in the mobile terminal's memory 10f. If the to-do list was entered into the host computer 14, this step causes the to-do list to be downloaded from the host computer 14 via the mobile terminal's modem 10g. Once the to-do list is stored in the mobile terminal's memory, the process of providing notifications to the user begins when the user enters a destination location into the mobile terminal 10. In an alternative embodiment, the notification process begins when the mobile terminal 10 detects a move of the automobile where the mobile terminal 10 is installed. In yet another embodiment, the mobile terminal 10 is not installed in the automobile but hand-carried by a user. In this case, the notification process begins when the user actuates a start button indicating that an errand is being run.

According to the first embodiment, the program, in step 102, requests the user to enter the destination location. In step 104, the program inquires if a specific destination address was provided. If the exact destination location was not provided, the program, in step 106, invokes the address conversion routine of FIG. 6.

In step 108, the program monitors the current location of the mobile terminal 10. In this regard, the GPS receiver 10c receives GPS signals from the GPS satellite system 12 providing the latitude and longitude information of the mobile terminal 10 as a current location according to well-known methods. The latitude and longitude information are then processed by the processor 10d for providing alerts to the user. Thus, the program, in step 110, compares the current location with the performance address of each of the to-do list items by converting each performance address to a latitude and longitude information also according to well-known methods.

In step 112, the program inquires if the proximity criteria for each of the to-do list items has been satisfied. The proximity criteria is based on numerous factors, such as the user's current position, the user's destination, the route chosen to reach the destination and the like. The proximity criteria may also vary from task to task. If the proximity criteria is based on the user's current position, the criteria is satisfied if the distance between a detected current location and a performance address is within a pre-determined proximity metric (i.e. one mile, one half mile, or the like).

If the proximity criteria is based on the selected destination location, the criteria is satisfied if the distance between the destination location and a performance address is within a pre-determined proximity metric, and the user has reached the intended destination.

If the proximity criteria is based on the route chosen to reach the destination location, the criteria is satisfied if the user embarks on a road that can lead to the performance location. In addition, the proximity metric selected to give a notification based on the user's current position also varies based on the route chosen by the user. Of two possible routes to the destination location, one might cause the user to pass further from the performance location than a second route. In this scenario, if the user selects the route which will cause him or her to pass further from the performance location, the proximity metric for giving notifications based on the user's current location might be increased.

If a particular to-do list item satisfies any of the proximity criteria, the program, in step 113 inquires if the to-do list item has been confirmed by some other user. If the answer is YES, the program inquires in step 115, if the notification is to be sent again. If the answer is YES, the program, in step 114, sends an alert for the item to the user (or multiple users if the task has been assigned to more than one individual). According to one embodiment of the invention, the user is alerted of the task by displaying the task description and performance location on the mobile terminal's screen display in bright colors or in a flashing mode. In another embodiment of the invention, an audio alert is provided where the mobile terminal verbally communicates the task description and performance location. In yet another embodiment, the alert includes both visual and audio components or vibrations (e.g. a flashing task description along with a "beeping" noise or vibration).

The user receiving the alert then sends a confirmation message using the input device 10a to acknowledge the alert. According to one embodiment of the invention, the input device 10a includes specialized keys or buttons allowing the user to send the confirmation message by simply actuating a key or button assigned to this function. The confirmation message may take the form of electronic mail, instant messaging, and the like.

In the case a host computer 14 is involved, the confirmation message is transmitted to the host computer 14 and includes the user ID of the confirming user and a "Confirmed" status code.

Thus, in step 116, the program inquires if the to-do list item has been confirmed. If the answer is YES, the program inquires in step 117 if the status of the item has been updated.

If the answer is NO, the host computer 14 updates the status of the to-do list item. Otherwise, the update occurs locally by the mobile terminal 10 itself. In either case, the program, in step 118, updates the status of the confirmed task by retrieving the to-do list table 30 and changing the "Status" field 30e of the task from "Not Notified" to "Confirmed."

If the update to the "Confirmed" status occurs within the host computer 14, the host computer 14 retrieves the user IDs of the other users sharing the confirmed to-do list item, and transmits an update status message to the mobile terminals belonging to such users to update their local to-do lists for the confirmed item. According to one embodiment of the invention, the update status message includes the user ID of the confirming user and the "Confirmed" status code. Alternatively, the update status message simply includes the "Confirmed" status code with no user ID. The mobile terminals 10 receiving the message then proceed to change the status of the confirmed to-do list item stored locally in each mobile terminal's memory 10f.

In a multiple user/multiple mobile terminal scenario not involving the host computer 14, the confirming user's mobile terminal transmits an update status message to the sharing users. The mobile terminals 10 receiving the message then proceed to change the status of the confirmed to-do list item stored locally in each mobile terminal's memory 10f.

According to one embodiment of the invention, only the user who has confirmed a task receives future alerts of the task. The alerts for a confirmed task vary (in sound and/or in the mode of display) from a non-confirmed task. Other users sharing the task preferably do not receive further alerts. Thus, a confirmed task is in essence removed from the other sharing users' to-do lists.

In step 120, the program inquires if a task has been completed. The user transmits a completion message upon completion of a task by actuating a specialized key or button assigned to this function. In the case a host computer 14 is involved, the completion message is transmitted to the host computer 14 and includes the user ID of the user and a "Completed" status code. Upon receipt of the completion message, the host computer 14 updates the status of the to-do list item. Otherwise, the update occurs locally by the mobile terminal 10 itself. In either case, the program, in step 126, updates the status of the completed task by retrieving the to-do list table 30 and changing the "Status" field 30e of the task to "Completed."

If the update to the "Completed" status occurs within the host computer 14, the host computer 14 retrieves the user IDs of the other users sharing the completed to-do list item, and transmits an update status message to such users to update their local to-do lists for the completed item. According to one embodiment of the invention, the update status message includes the user ID of the user and the "Completed" status code. Alternatively, the update status message simply includes the "Completed" status code with no user ID. The mobile terminals 10 receiving the message then proceed to change the status of the completed to-do list item stored locally in each mobile terminal's memory 10f.

In a multiple user/multiple mobile terminal scenario not involving the host computer 14, the completing user's mobile terminal transmits an electronic mail, instant message, or another electronic communication with the update status message, to the sharing users. The mobile terminals 10 receiving the message then proceed to change the status of the confirmed to-do list item stored locally in each mobile terminal's memory 10f.

In step 122, the program inquires if there are other non-completed tasks that the user need to be alerted of. If all tasks have been completed, the program ends. Otherwise, the program returns to step 108 for further monitoring of the user's current location.

While the invention has been described with respect to particular illustrated embodiment, those skilled in the art and technology to which the invention pertains will have no difficulty devising variations which in no way depart from the invention. Accordingly, the present invention is not limited to the specific embodiments described above, but rather as defined by the scope of the appended claims and their equivalents.

What is claimed is:

1. A method for providing electronic notifications of a to-do list item, the method comprising:

entering the to-do list to a mobile user terminal having a memory, each item on the to-do list being associated with a performance location;

storing the to-do list in the memory;

maintaining a status of each to-do list item;

automatically detecting a current position of the mobile user terminal;

comparing the current position of the mobile user terminal with the performance location of a to-do list item;

electronically notifying the user when a proximity criteria of the to-do list item has been satisfied;

updating the status of the to-do list item in response to a user command;

associating one or more user identifiers with a to-do list item, each user identifier corresponding to a user sharing the to-do list item;

receiving a confirmation message for a to-do list item from a user having a user identifier associated with the to-do list item;

retrieving other user identifiers associated with the confirmed to-do list item; and transmitting an update status message of the to-do list item to other users associated with the other user identifiers, the update status message excluding the other users from further notification of the confirmed to-do list item.

2. A mobile user terminal comprising:

a user input for entering a to-do list, each item on the to-do list being associated with a performance location;

a memory coupled to the user input for storing the to-do list and the performance location of each of the items, the memory further storing a status indication for each to-do list item;

a global positioning system (GPS) receiver for receiving GPS signals;

a processor coupled to the GPS receiver and the memory for determining a current location of the mobile user terminal based on the GPS signals, the processor further comparing the current position of the mobile user terminal with the performance location of a to-do list item and updating the status indication for the to-do list item in response to a user command; and a display screen for displaying a notification when a proximity criteria of the to-do list item has been satisfied;

wherein the memory stores one or more user identifiers with a to-do list item, each user identifier corresponding to a user sharing the to-do list item, and wherein the processor, after receiving a confirmation message for a to-do list item from a particular user with a user identifier associated with the to-do list item, retrieves other user identifiers associated with the confirmed to-do list item from the memory and transmits an update status message of the to-do list item to the other users associated with the other user identifiers, the update status message excluding other users from further notification of the confirmed to-do list item.

3. In a computer network enabling communication between a host computer having a database and a plurality of user mobile terminals, a method for providing electronic notifications of a to-do list item, the method comprising:

downloading the to-do list to the mobile user terminal from the host computer, each item on the to-do list being associated with a performance location and one or more user identifiers, each user identifier corresponding to a user sharing the to-do list item;

automatically detecting a current position of the mobile user terminal;

comparing the current position of the mobile user terminal with the performance location of a to-do list item;

electronically notifying the user when a proximity criteria of the to-do list item has been satisfied;

transmitting a confirmation message for the to-do list item to the host computer upon receipt of the notification;

retrieving the user identifiers associated with the confirmed to-do list item; and transmitting an update status message of the to-do list item to the users associated with the retrieved user identifiers, the update status message excluding the users who did not transmit the confirmation from further notification of the confirmed to-do list item.

4. The method of claim 3, wherein the mobile user terminal includes a global Positioning system (GPS) interface and the automatically detecting comprises processing GPS signals received through the GPS interface.

5. The method of claim 3, wherein the current position is a destination location.

6. The method of claim 3, wherein the proximity criteria is based on a route chosen to reach a destination location.

7. The method of claim 3, wherein the proximity criteria is satisfied when the current position is within a pre-defined proximity metric to the performance location of the to-do list item.

8. The method of claim 3 further comprising:

searching the database for the performance location, the database including a plurality of performance location entries, each entry mapping a performance location to a performance address; and retrieving the performance address of the performance location.

9. A system for providing electronic notifications of a to-do list item, the system comprising:

a host computer comprising:
- an input means for entering the to-do list, each item on the to-do list being associated with a performance location and one or more user identifiers, each user identifier corresponding to a user sharing the to-do list item;
- a first database means coupled to the input means for storing the to-do list and the performance location and user identifiers associated with each of the items;
- a second database means coupled to the input means for storing a location database having a plurality of performance location entries, each entry mapping a performance location to a performance address;
- a first processor coupled to the first and second database means for converting the performance location of an item on the to-do list to a performance address; and
- a first communication means coupled to the first processor for transmitting the to-do list and the performance addresses;

a plurality of mobile user terminals in communication with the host computer, each user mobile terminal comprising:
- a second communication means for downloading the to-do list and the performance addresses from the host computer;
- a memory coupled to the second communication means for downloading the to-do list and the performance addresses;
- a global positioning system (GPS) receiver for receiving GPS signals;
- a second processor coupled to the GPS receiver and the memory for determining a current location of the mobile user terminal based on the GPS signals, the second processor further comparing the current position of the mobile user terminal with the performance address of a to-do list item; and
- a display screen for displaying a notification when a proximity criteria of the to-do list item has been satisfied.

10. The system of claim 9, wherein the mobile user terminal includes a user input for entering a destination location and the second processor compares the destination location with the performance address of a to-do list item.

11. The system of claim 9, wherein the proximity criteria is based on a route chosen to reach a destination location.

12. The system of claim 9, wherein the proximity criteria is satisfied when the current position is within a pre-defined proximity metric to the performance location of the to-do list item.

13. The system of claim 9, wherein a user with a user identifier associated with a to-do list item transmits a confirmation message for the item to the host computer via the second communication means, and the host computer retrieves other user identifiers associated with the confirmed to-do list item and transmits an update status message of the to-do list item to other users associated with the other user identifiers, the update status message excluding the other users from further notification of the confirmed to-do list item.

* * * * *